United States Patent [19]
Lokman

[11] Patent Number: 6,055,662
[45] Date of Patent: Apr. 25, 2000

[54] COMMUNICATIONS TRANSACTIONAL MESSAGE HANDLING

[75] Inventor: Latif Lokman, Wimbledon, United Kingdom

[73] Assignee: ICO Services Ltd., London, United Kingdom

[21] Appl. No.: 09/209,269

[22] Filed: Dec. 11, 1998

[30] Foreign Application Priority Data

Mar. 5, 1998 [EP] European Pat. Off. .............. 98301638

[51] Int. Cl.⁷ ..................................... H04Q 7/00
[52] U.S. Cl. ....................... 714/749; 455/31.3; 455/517; 340/825.54
[58] Field of Search .................... 455/31.2, 31.3, 455/427, 428, 12.1, 517; 340/825.54; 714/749

[56] References Cited

U.S. PATENT DOCUMENTS

| | | |
|---|---|---|
| 4,646,300 | 2/1987 | Goodman et al. . |
| 4,910,733 | 3/1990 | Sommani et al. . |
| 5,359,323 | 10/1994 | Michel ............................... 340/825.54 |
| 5,596,318 | 1/1997 | Mitchell . |
| 5,706,211 | 1/1998 | Beletic et al. ..................... 340/825.54 |
| 5,797,096 | 8/1998 | Lupien et al. ........................... 455/517 |
| 5,878,351 | 3/1999 | Alanara et al. ........................ 455/31.3 |
| 5,884,142 | 3/1999 | Wiedeman et al. .................... 455/12.1 |
| 5,889,770 | 3/1999 | Jokiaho et al. .......................... 455/433 |
| 5,951,706 | 9/1999 | Benner .................................... 714/749 |
| 5,953,676 | 9/1999 | Berry et al. .............................. 455/517 |

FOREIGN PATENT DOCUMENTS

| | | | |
|---|---|---|---|
| 8-1673903 | 6/1996 | Japan ............................. | H04L 12/28 |
| 8-167903 | 6/1996 | Japan . | |

*Primary Examiner*—Wellington Chin
*Assistant Examiner*—Simon Nguyen
*Attorney, Agent, or Firm*—McDermott, Will & Emery

[57] ABSTRACT

In a communications system, in the embodiment, a satellite communications system, transactional messages 28 36 are exchanged between the user terminal 14 and a base station (earth station) 16 via a communications satellite 10 in order to set up and maintain the progress of a call, encompass occasional user terminal registration and position estimation, allow call termination and attend to a host of other housekeeping processes. The prior art required the sending of acknowledgement messages 32 between transactional messages. The invention replaces the sending and requesting of acknowledgement messages 32 with an each-end recognition of the style of transactional responses as an ipse facto acknowledgement, thereby much speeding up the transactional message and transactional response/message exchange, so releasing time resources to the system.

28 Claims, 5 Drawing Sheets

COMMUNICATIONS TRANSACTIONAL MESSAGE HANDLING

FIELD OF THE INVENTION

The present invention relates to communications systems. In particular, the present invention relates to radio communications system where a terminal or handset communicates with a base station. In greatest particularity, the present invention relates to a radio communications system where the base station communicates with the handset or terminal through a communications satellite.

BACKGROUND

Communications require two terminals, connected by a medium. In terrestrial communications, a telephone handset is generally connected to a telephone exchange by wires, fibre optics or coaxial cable. In terrestrial radio communications, a user terminal (otherwise, a handset) is in two way radio communications with a base station. In satellite communications, a user terminal (otherwise a handset) is coupled, by radio, to an radio base station on the earth's surface, through an intervening communications satellite.

In any of these systems, but especially in the two sorts of radio systems, a great deal of mutual transaction takes place between the user terminal and the base station before any meaningful call activity can take place. Firstly, the base station must register the user terminal. This requires an exchange of plural transactional messages and responses between the base station and the user terminal so that the base station can identify the user terminal, the user terminal can identify the base station, and so on. To commence a call, a further plurality of transactional messages and transactional responses must be exchanged between the base station and the user terminal whereby the user terminal becomes identified to the base station, the base station allocates a channel to the user terminal, the user terminal identifies the number to be called, the call is connected, and so on. All this happens before any voice or data communications can take place. Then, in the course of a call, the user terminal may require to switch base stations because the user terminal has moved out of the range of one and into the range of another. Yet another set of exchanges transactional messages and responses are required. Thereafter, the call must be terminated. A yet further set of transactional messages and responses is required to pass between the base station and the user terminal. Even when no activity is taking place, the "dormant" user terminal is required, periodically, or on changing area, automatically to reregister with the system. Here, again, a plethora of transactional messages and responses must pass between the user terminal and the base station, albeit without, in this instance, the knowledge or awareness of the possessor of the user terminal.

The problem becomes more acute when the access to and from the base station includes an intervening communications satellite. In terrestrial radio systems, such as GSM, time slots are allocated under a system known as TDMA (Time Division Multiple Access). Because the distance between a user terminal and a base station is generally small, the propagation delay is limited to just a few microseconds, and, for all practical purposes, the propagation delay can be counted as practically zero. However, in satellite systems, the round trip propagation delay, from earth to satellite and back to earth, can be quite large. In the case of a mid earth orbit system, such as is proposed for the ICO system, where the satellites are set into circular orbits at around 10,000 Km above the surface of the earth, the round trip delay can exceed one third of a second. In the case of geostationary communications satellites, which are set in geosynchronous equatorial orbits above the equator at a height of 25000 Km above the surface of the earth such that the nadir of each satellite stays stationary on the surface of the earth as the earth rotates, the round trip delay can approach one second. This creates severe timing problems with the TDMA timeslot allocation and introduces a further delay in call set-up. Satellite systems, unlike terrestrial systems, also attempt to locate the position of the user terminal on the surface of the earth before each call and on registration. This, too, involves a lot of mutual transactions between the user terminal and the satellite.

The routine is that one terminal (say, the handset or user terminal) sends a transactional message to the other terminal (say, the earth station via the satellite). A propagation delay ensues. The other terminal receives the transactional message. The first thing it does is to create an acknowledgement to the transactional message. This is stored in a buffer. When the next TDMA timeslot comes up, the earth station sends back the acknowledgement to the user terminal. A further propagation delay occurs. Meanwhile, the earth station has formulated the transactional response and placed it into a buffer. The next occasion when a TDMA transmission timeslot is available, which could be some little while away, the transactional response is sent back to the user terminal. And so it goes on, the user terminal and the earth station swapping transactional messages, acknowledgements and transactional responses, very like a game of Ping-Pong, until the required purpose has been achieved.

All of this imposes a large time and power overhead on the system. Even if the time taken is just a few seconds, the events occur, in the system, somewhere, nearly all of the time. The number of lost call hours per year to the system can be truly enormous. Many calls could be lost in a limited resource system such as satellite communications. The battery drain on the user terminal, most acute during transmission, can be unacceptably high. The same is true of a communications satellites, which have finite instant power available and may become over taxed at times of heavy traffic.

U.S. Pat. No. 4,910,733 discloses a local area network protocol in which an acknowledgement is dispersed with and the transactional response is itself used as an acknowledgement. However, the protocol requires the entire network to adopt the protocol and cannot operate both according to a conventional scheme with a separate acknowledgement signal, and the system which uses the transactional response as the acknowledgement. Thus the network is inflexible and not readily capable of expansion in capacity using both acknowledgement schemes.

The present invention seeks to simplify the transactions between the terminals (e.g., earth or base station and the user terminal, and indeed, in any other mutually signalling communications system) in a manner which is compatible with existing transactional protocols, without, in any way, reducing the total message or response value, and seeks thereby to save system time and to minimise battery and power drain.

SUMMARY OF THE INVENTION

According to a first aspect, the present invention consists in a communications system wherein a first terminal is operative to send a transactional message to a second terminal and wherein said second terminal is operative to send an acknowledgement of receipt of said transactional message to said first terminal and is thereafter operative to send a transactional response to said first terminal; said system being characterised by said second terminal being operative to omit to send said acknowledgement to said first terminal and to send said transactional response in place of said acknowledgement, said first terminal being operative to examine the form of said transactional response, and said first terminal being operative to accept said transactional response as indicative of receipt of said transactional message by said second terminal if said transactional response is in a correct form.

According to a second aspect, the present invention consists in a first terminal, in a communications system, operative to send a transactional message to a second terminal, where said second terminal is operative to send an acknowledgement of receipt of said transactional message to said first terminal and is thereafter operative to send a transactional response to said first terminal; said first terminal being characterised by: when said second terminal is operative to omit to send said acknowledgement to said first terminal and to send said transactional response in place of said acknowledgement, said first terminal is operative to examine the form of said transactional response, and said first terminal is further operative to accept said transactional response as indicative of receipt of said transactional message by said second terminal if said transactional response is in a correct form.

According to a third aspect, the present invention consists in a second terminal, in a communications system, wherein a first terminal is operative to send a transactional message to said second terminal, where said second terminal is operative to send an acknowledgement of receipt of said transactional message to said first terminal and where said second terminal is thereafter operative to send a transactional response to said first terminal; said second terminal being characterised by being operative to omit to send said acknowledgement to said first terminal and to send said transactional response in place of said acknowledgement, for said first terminal to examine the form of said transactional response and to accept said transactional response as indicative of receipt of said transactional message by said second terminal if said transactional response is in a correct form.

According to a fourth aspect, the present invention consists in a method for operating a communications system wherein a first terminal is operative to send a transactional message to a second terminal and wherein said second terminal is operative to send an acknowledgement of receipt of said transactional message to said first terminal and is thereafter operative to send a transactional response to said first terminal; said method being characterised by including the steps of: causing said second terminal to omit to send said acknowledgement to said first terminal, causing said first terminal to send said transactional response in place of said acknowledgement, causing said first terminal to examine the form of said transactional response, and causing said first terminal to accept said transactional response as indicative of receipt of said transactional message by said second terminal if said transactional response is in a correct form.

The various aspects of the invention also allow hat the transactional response is operative to act as a transactional message for the first terminal, the first terminal omitting to send an acknowledgement of receipt of the transactional response, and sending, to the second terminal, a further transactional response, the second terminal being operative to examine the further transactional response and to accept the further transactional response as indicative of the first terminal having received the transactional response, operative to act as a transactional message for said first terminal, if the further transactional response is in a correct form.

The various aspects of the invention also provide that the first terminal is operative to determine that the transactional response is in a correct form if the transactional response conforms to any one out of a first plurality of possible correct forms.

The various aspects of the invention further provide that the second terminal is operative to determine that further transactional response is in a correct form if the further transactional response conforms to any one out of a second plurality of possible correct forms.

The various aspects of the invention, yet further, provide that the first terminal is a radio terminal and the second terminal is a radio terminal.

The various aspects of the invention, even further, provide that the first terminal is a telephone handset and the second terminal is a radio telephone base station.

Even further, the various aspects of the invention provide that the base station is a satellite communications base station, operative to communicate with the telephone handset via a communications satellite.

The preferred embodiment of the invention, hereinafter described, is limited, in its description, to a TDMA environment, purely by way of example. It is to be understood that the present invention can be applied other forms of signal and timing organisation.

Equally, the description of the preferred embodiment is centred around a communications satellite environment. It is to be understood that the present invention can be applied, with benefit, to any other communications system where transactional exchange is required between two terminals to establish a proper basis for establishment of communications.

Again, the description of the preferred embodiment of the present invention is limited, in its description, to just one aspect of the mutual transactivity between the terminals, namely call set-up. It is to be understood that the present invention equally applies to all aspects of transactivity between the terminals, and includes, but is not limited to, registration, cell handover, position determination, and call termination.

It is preferred, in the embodiment, that the satellite system in question is a MEO (Mid Earth Orbit) system. It is to be understood that the invention equally applies to LEO (Low Earth Orbit) and GEO (Geostationary Earth Orbit, as well as to orbits of any height or configuration.

BRIEF DESCRIPTION OF THE DRAWINGS

The invention is further explained, by way of an example, by the following description, taken in conjunction with the appended drawings, in which.

DETAILED DESCRIPTION

Figure 1:
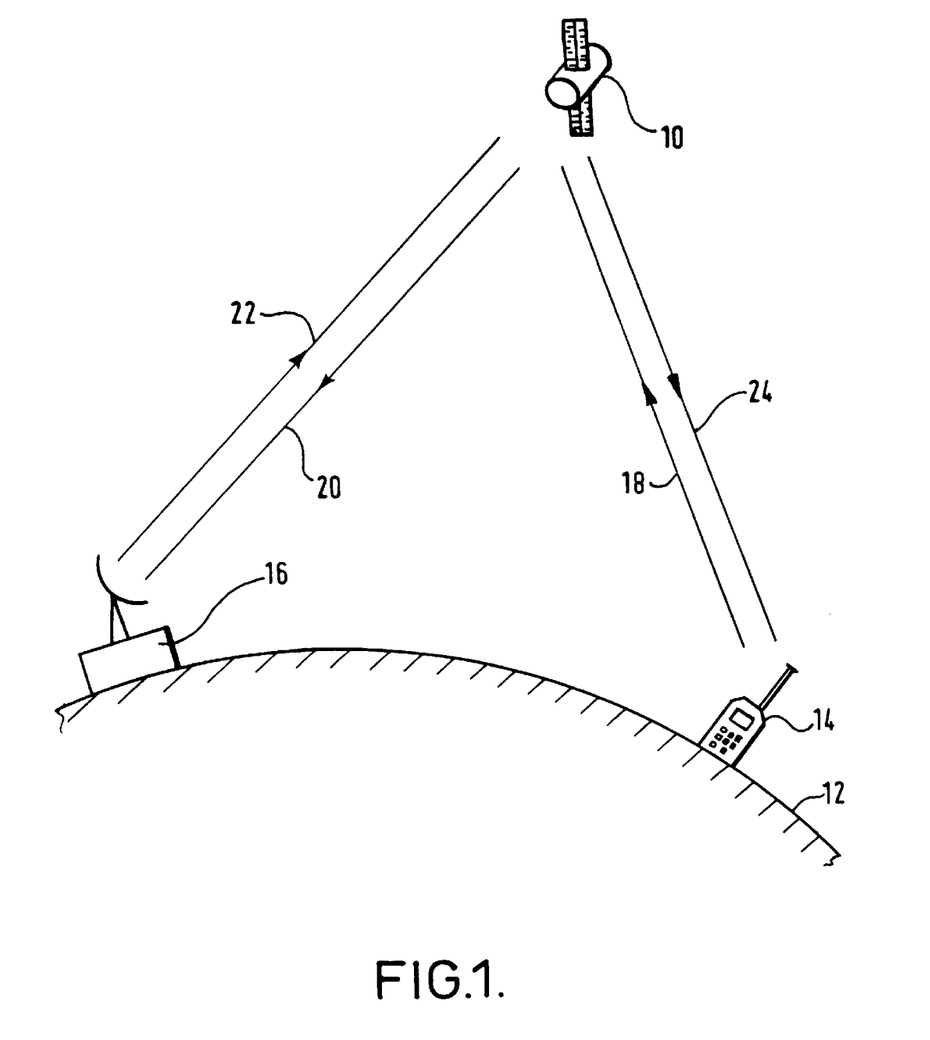
FIG. 1 is a schematic representation of the environment wherein the present invention is presented in the preferred embodiment, showing a user terminal, on the surface of the earth, communicating via a communications satellite, with an earth station and associated controller, elsewhere on the surface of the earth.

FIG. 1 shows the environment of the preferred embodiment of the present invention. A communications satellite 10 is in orbit above the surface of the Earth 12. A user terminal 14, in the form of a cellular telephone handset, is also on the surface of the earth 12. A satellite earth station 16 is also situated on the surface of the Earth 12, at a point elsewhere than that occupied by the user terminal 14. The user terminal 14 sends signals to the satellite 10 by means of a user terminal uplink 18. The satellite 10 relays these signals to the earth station 16 by the earth station downlink 20. The earth station 16 sends signals to the satellite 10 by the earth station uplink 22. The satellite 10 relays these signals to the user terminal 14 by the user terminal downlink 24. In this manner the user terminal 14 and the earth station 16 are able to communicate via the satellite 10. In this setup, the user terminal 14 constitutes a first terminal of the system and the earth station 16 constitutes a second terminal of the system. As earlier stated, the user terminal 14 could equally be a terrestrial cellphone rather than a satellite cellphone, and the earth station 16 could equally be a terrestrial cellular base station.

The earth station 16 is connected to the terrestrial telephone system (not shown) and thereby enables the user terminal 14 to connect to, and make calls in, the terrestrial telephone system. The earth station 16 acts as an intermediary between the user terminal 14 and the terrestrial telephone system. However, the user terminal 14 and the earth station 16 require to make connection with each other on a satisfactory signalling and verification basis, and thereafter require mutual co-operation to establish the call within the terrestrial telephone system.

When making a connection one to another, the user terminal 14 and the earth station 16 require to run through a protocol which includes the user terminal 14 identifying itself to the earth station 16 and being verified. The earth station 16 must co-operate, by signal exchange and report-back messages from the user terminal 14, to establish the position of the user terminal 14 on the surface of the earth 12. The earth station must also allocate a channel (frequency and a TDMA timeslot) for signal exchange between the user terminal 14 and the satellite 10. Even more important, being ever mindful that the satellite 10 is in orbit and moving through space at some 15 Km per second at an altitude of 10355 Km above the earth 12 surface (in the example which constitutes the preferred embodiment), the earth station 16 must indicate the offset in the frequency of the channel required to compensate for Doppler frequency shift caused by relative motion between the satellite 10 and the user terminal 14. Equally important, being ever aware that the satellite 10 is some 10355 Km above the surface of the earth 12, and that a variable time delay exists in signal propagation between the earth station 16 and the user terminal 14 depending upon the instant dispositions of the earth station 16 (fixed), the satellite (moving) and the user terminal 14 (temporarily in a particular location), the earth station 16 must inform the user terminal 14 what that time delay is so that the timing of sending of the allocated TDMA timeslot by both the earth station 16 and the user terminal 14 can be adjusted to allow the timeslot to arrive at the earth station 16 or the user terminal 14 in synchronism with a rolling universal timing allocation. This is achieved by a series of selectable block delays known as z-arcs and a fine tuning of the delay, dependant upon the position of the user terminal 14 relative to the centre of the selected z-arc. In addition, the user terminal 14 will register with the earth station 16 when first signing-on (whether or not a call is made) and at periodical intervals thereafter.

It therefore becomes clear that a great deal of transactional traffic has to pass between the user terminal 14 and the earth station 16 even although there is no actual voice traffic (or any other type of "normal" telephone traffic such as facsimile, etc.) in progress. All of this activity represents a costly overhead to the system in both time and resources, and can be most disadvantageous to a limited resource system such as a satellite communications system. If time can be released, then that time becomes available for "normal" telephone calls, adding revenue for the system operator and apparently expanding the size of the system. It is this problem that the present invention seeks to address.

Figure 2A:
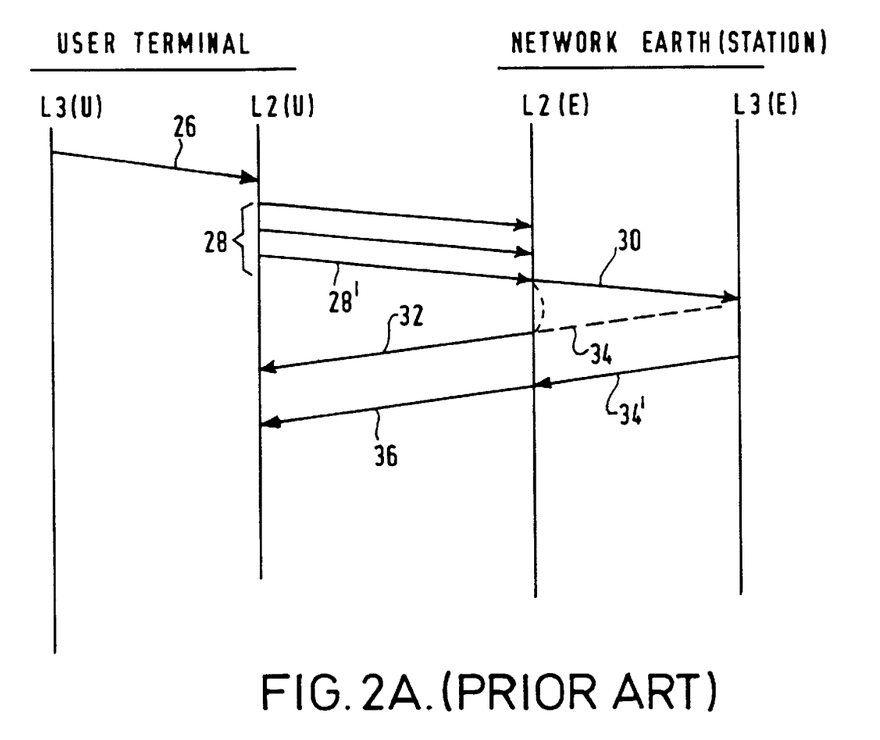
FIG. 2A illustrates transactional message exchange between the user terminal and the earth station according to the prior art.

FIG. 2A shows the prior art approach to message exchange. The example in FIG. 2A relates to a routine, initiated by the user terminal 14. It is to be understood that an exact, mirror process exists for routines initiated by the earth station 16.

The control systems of both the user terminal 14 and of the earth station 16 comprise plural layers. For the purpose of this example, only two layers are shown in each. Layer three in the user terminal L3(U) deals, for the purpose of this example, with the internal processing and control of the user terminal 14. Layer two in the user terminal L2(U) deals with the external transactions of the user terminal 14 with the earth station 16. Layer three in the earth station 16 L3(E) deals, for the purpose of this example, with the internal processing and control of the earth station 16 and also interacts with the greater network to which the earth station 16 is connected. Layer two in the earth station 16 L2(E) deals with the external transactions of the earth station 16 with the user terminal 14.

The example given is a specific call (service) request from the user terminal 14 and presumes that all of the other numerous activities, earlier recited as necessary before a service (call) request could be made, have been executed.

The third layer L3(U) of the user terminal 14, recognising that the possessor of the user terminal 14 wishes to place a call, passes a service request message 26 to the second layer L2(U) of the user terminal, which, in turn, via the satellite 10, passes a plurality of information frames 28 to the second layer L2(E) of the earth station 16. The last Information frame 28' contains a "poll bit" which, if set, requests an acknowledgement of receipt. In this example, each information frame comprises an 8-bit header, a 64-bit message, and an 8-bit CRC (Cyclic Redundancy Check). Other lengths and configurations of information frames could be used.

Layer two L2(E) of the earth station 16 passes a service request message 30 to the third layer L3(E) of the earth station 16, and, if the "poll bit" was set, sends an acknowledgement message 32 back to the second layer L2(U) of the user terminal. The acknowledgement message may confirm receipt of each of the information frames 28, or may indicate that one or more of the information frames 28 were not properly received, in which case (not shown), layer two L2(U) of the user terminal 14 will resend those information frames 28, received in error by the earth station 16.

The third layer L3(E) of the earth station 16 may experience some delay, since it deals not only with the earth station, but with the network as a whole. Under ideal conditions (shown dotted line), the third layer L3(E) of the earth station 16 can provide a page authorisation 34' 34 almost fast enough to be included in the TDMA timeslot occupied by the acknowledgement message 32, sent to the user terminal. Unfortunately, the acknowledgement message is in the way, and the opportunity to "piggy back" the second layer L2(E) response to the page authorisation 34 34' in this way rarely happens. Instead, at some later time, when another TDMA transmission timeslot arises, the third layer L3(E) having provided the page authorisation 34 to the second layer L2(E) of the earth station 16, the second layer L2(E) in turn, provides a page authorisation message 36 to the second layer L2(U) of the user terminal 14.

Figure 2B:
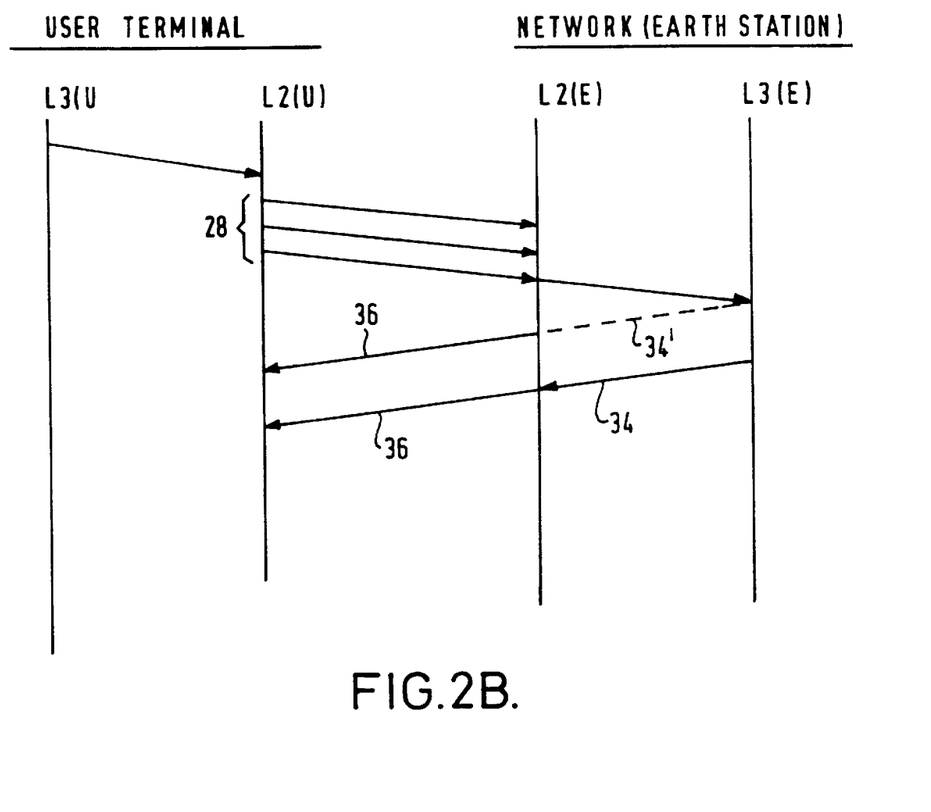
FIG. 2B illustrates transactional message exchange between the user terminal and the earth station according to a preferred embodiment of the invention.

FIG. 2B is the system according to the present invention, The same reference numerals have the same meanings. What is different between FIGS. 2A and 2B is simply that the acknowledgement message is suppressed, allowing the page authorisation message 36 to go out on the soonest available timeslot, if the page authorisation message 36 is then available. Equally, FIG. 2B reflects a change in the behaviour of the terminals 16 14 whereby acknowledgement messages are automatically and ipse facto received. This will become clear as a result of later description.

An important point to note is that the page authorisation message 36 may be one of a range of messages. The page may, indeed, have been authorised, Alternatively, the page may have been rejected. The system may be of the opinion that the signal is poor. The user terminal 14 will require to respond to any one of these messages.

It is also important to note, for understanding of the following description of the preferred embodiment of the invention, that all transaction take place in the same general way as described with reference to FIG. 2B.

In the example given in FIGS. 2A and 2B, the information frames 28 28' represent a transactional message, and the page authorisation message 36 represents a transactional response.

In the example given for the preferred embodiment, being the ICO satellite communications system, the call setup routine involves no fewer than seventeen messages/ responses which require eight acknowledgements. In the ordinary GSM system, there are some twelve messages/ responses which require eleven acknowledgements. By omitting the acknowledgements, the present invention is estimated to save up to four seconds per call setup in the ICO system. This is for call setup alone. When added to the savings in all other activities, the overall system saving can be quite considerable.

It is to be noted that, in sequences of message exchanges, such as call setup, the transactional response for one terminal can become the transactional message for the other, and vice versa.

Figure 3:
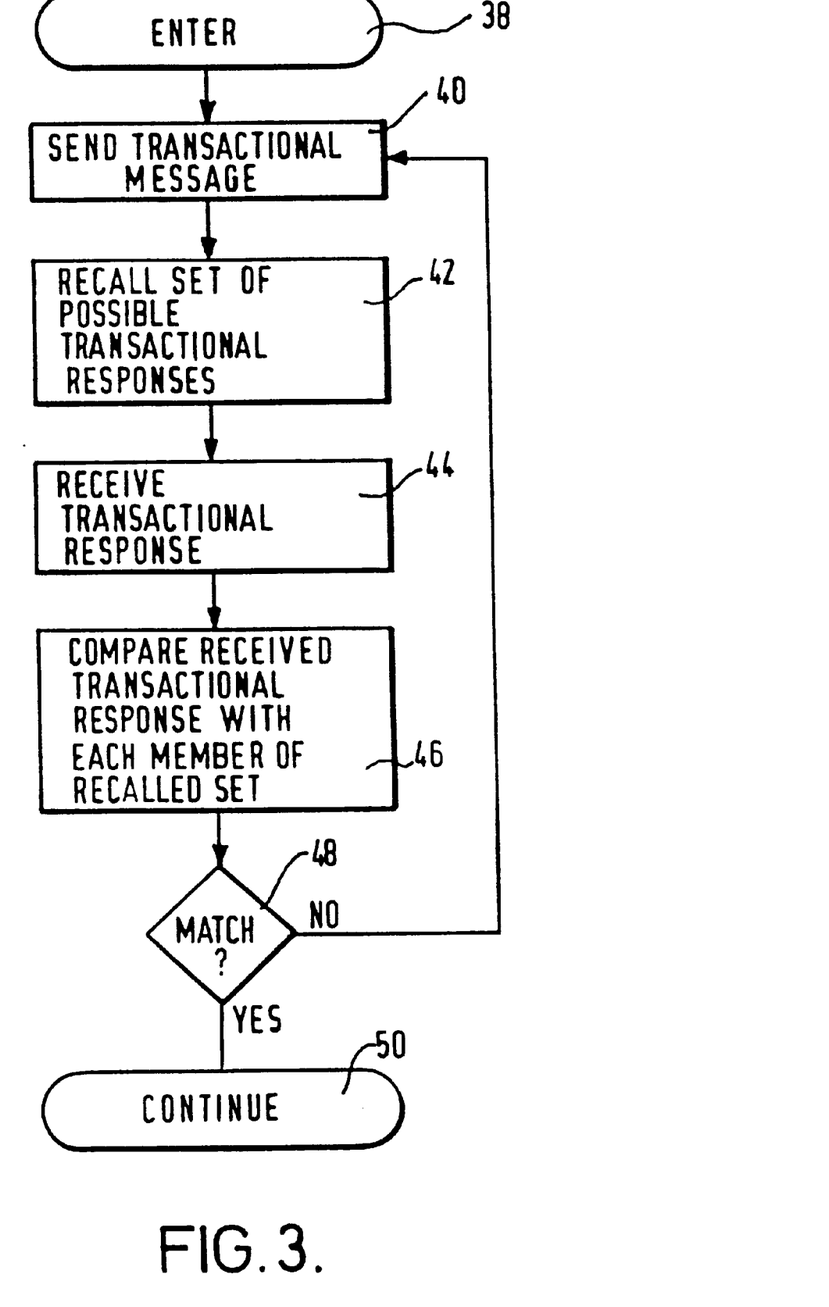
FIG. 3 is a flowchart of the behaviour of both terminals (the user terminal and the earth station) when performing a method according to the invention.

FIG. 3 is a flowchart of the behaviour of both terminals (user terminal 14 and earth station 16) when acting according to the present invention.

The flowchart of FIG. 3 represents only a tiny fraction of the overall control function in the layers L2(U) L2(E) L3(U) L3(E), but is the part, relevant to the present invention. In particular, it replaces that element of the prior art control function which recognises and accepts acknowledgements.

Entry 38 is from the overall control function where a first operation 40 sends the transactional message (or transactional response) to the other terminal (i.e. user terminal 14 to earth station 16 or vice versa). Control then passes to a second operation 42 where the terminal (user terminal 14 or earth station 16) recalls that set of possible acceptable responses to the transactional message (or transactional response) sent out in the first operation 40. A third operation 44 then waits and receives the transactional response from the other terminal (earth station 16 or user terminal 14). A fourth operation 46 then compares the transactional response, received in the third operation 44, with each in turn of the members of the set of acceptable transactional responses retrieved from an internal memory in the second operation 42. If a formal match is found in a test 48, the transactional response, received in the third operation 44, is accepted as a validation or acknowledgement that the other terminal successfully received the transactional message (or transactional response) sent out in the first operation 42. Control then continues 50 back with the mainstream of the operation of the terminal (user terminal 14 or earth station 16). If no match is found, this is indicative that the terminal (user terminal 14 or earth station 16) is uncertain whether or not the transactional message (or transactional response), sent out in the first operation 42, has been received by the other terminal (earth station 16 or user terminal 14). Control can then be passed from the test 48 back to the first operation 42 to resend the transactional message (or transactional response), or onto any other recovery routine which the overall operational system (not part of the present invention) may deem appropriate.

The set of possible transactional responses, retrieved in the second operation 42, may comprise just one acceptable type, or a plurality of acceptable types, depending upon the nature of the transactional message (or transactional response) sent out in the first operation 42.

A problem arises with forward compatibility. In modifying any system, it is essential that old-style equipment will be compatible with new-style equipment, and vice versa. To that end, the present invention also provides that any new-style equipment, practising the present invention, will, on receipt of an acknowledgement request, provide the requested acknowledgement message 32, although the new style equipment, operating with other new-style equipment, will completely suppress such acknowledgement requests and sending of acknowledgement messages 32.

Figure 4:
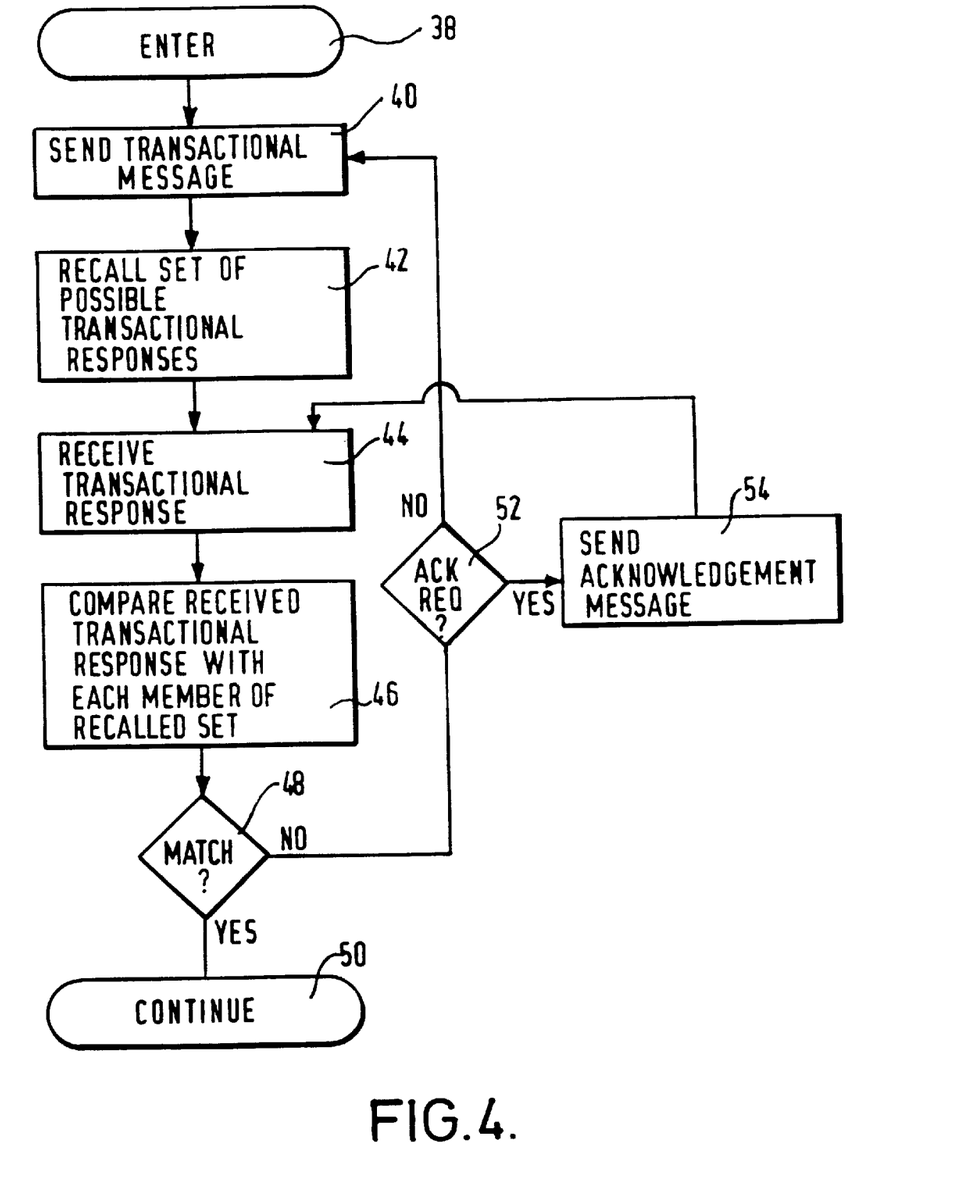
FIG. 4 illustrates the behaviour according to a modified method in accordance with the invention.

FIG. 4 shows this behaviour in a flowchart modified over that shown in FIG. 3, like numerals having same designations and descriptions as in FIG. 3. The difference with FIG. 3 is that, if the first test 48 does not find a match, control is passed to a second test 52 which examines the transactional response received by the third operation 44 to see if it is an acknowledgement request. If it is, a fifth operation 54 sends the acknowledgement message 32 to the other terminal (user terminal 14 or earth station 16) and returns control to the third operation 44 to wait for the transactional response. If it is not an acknowledgement request, control returns (dependently upon the wish of the skilled designer) either to the first operation 42 or to some other failure recovery mechanism within the overall operating system. In this way, old-style equipment will operate with new-style equipment and offers the advantage that, although not entirely eliminated, the number of acknowledgement messages 32 is, at least, reduced.

The present invention, by the realisation that a correct transactional response 36 is an ipse facto acknowledgement of receipt of a transactional message 28, by the deliberate omission of acknowledgement messages 32, and by the substitution of further means 42 44 46 whereby the correctness of a transactional response may be examined to create an ipse facto real recognition of correct receipt of the original transactional message 28, by simplification of the system and substitution of one activity, achieves the technical effect of improved system speed and apparent increase in system capacity.

I claim:

1. A communications system in which a first terminal is operative to send a transactional message to a second terminal and in which said second terminal is operative to send an acknowledgement of receipt of said transactional message to said first terminal followed by a transactional response to said first terminal; in which the improvement comprises said second terminal being configured to skip sending said acknowledgement to said first terminal and to send said transactional response in place of said acknowledgement, said first terminal being configured to examine the form of said transactional response and said first terminal being configured to accept said transactional response as indicative of receipt of said transactional message by said second terminal if said transactional response is in a correct form.

2. A system, according to claim 1, in which said transactional response is operative to act as a transactional message for said first terminal, said first terminal is configured to skip sending an acknowledgement of receipt of said transactional response and to send to said second terminal a further transactional response, and said second terminal is configured to examine said further transactional response and to accept said further transactional response as indicative of said first terminal having received said transactional response operative to act as a transactional message for said first terminal, if said further transactional response is in a correct form.

3. A system, according to claim 1 wherein said first terminal is operative to determine that said transactional response is in a correct form if said transactional response conforms to any one out of a first plurality of possible correct forms.

4. A system, according to claim 1, wherein said second terminal is operative to determine that said further transactional response is in said correct form if said further transactional response conforms to any one out of a second plurality of possible correct forms.

5. A system, according to claim 1, wherein said first terminal is a radio terminal and said second terminal is a radio terminal.

6. A system, according to claim 5, wherein said first terminal is a telephone handset and said second terminal is a radio telephone base station.

7. A system, according to claim 6, wherein said base station is a satellite communications base station, operative to communicate with said telephone handset via a communications satellite.

8. A first terminal, in a communications system, operative to send a transactional message to a second terminal, where said second terminal is operative to send an acknowledgement of receipt of said transactional message to said first terminal and is thereafter operative to send a transactional response to said first terminal; in which, when said second terminal is operative to skip sending said acknowledgement to said first terminal and to send said transactional response in place of said acknowledgement, said first terminal is operative to examine the form of said transactional response, and to accept said transactional response as indicative of receipt of said transactional message by said second terminal if said transactional response is in a correct form.

9. A first terminal, according to claim 1, wherein said transactional response is operative to act as a transactional message for said first terminal, and said first terminal is configured to omit sending an acknowledgement of receipt of said transactional response, and to send to said second terminal a further transactional response, said second terminal being operative to examine said further transactional response and to accept said further transactional response as indicative of said first terminal having received said transactional response operative to act as a transactional message for said first terminal if said further transactional response is in a correct form.

10. A first terminal, according to claim 8, operative to determine that said transactional response is in a correct form if said transactional response conforms to any one out of a first plurality of possible correct forms.

11. A system, according to claim 9, for use where said second terminal is operative to determine that said further transactional response is in said correct form if said further transactional response conforms to any one out of a second plurality of possible correct forms.

12. A first terminal, according to claim 8, being a radio terminal for use where said second terminal is also a radio terminal.

13. A first terminal, according to claim 12, wherein said first terminal is a telephone handset and said second terminal is a radio telephone base station.

14. A first terminal, according to claim 13, for use where said base station is a satellite communications base station, operative to communicate with said telephone handset via a communications satellite.

15. A second terminal, in a communications system, wherein a first terminal is operative to send a transactional message to said second terminal, where said second terminal is operative to send an acknowledgement of receipt of said transactional message to said first terminal and where said second terminal is thereafter operative to send a transactional response to said first terminal; in which said second terminal is configured to be operative to skip sending said acknowledgement to said first terminal and to send said transactional response in place of said acknowledgement and for said first terminal to examine the form of said transactional response and to accept said transactional response as indicative of receipt of said transactional message by said second terminal if said transactional response is in a correct form.

16. A second terminal, according to claim 1, wherein said transaction response is operative to act as a transactional message for said first terminal, said first terminal skipping sending an acknowledgement of receipt of said transactional response, and sending to said second terminal a further transactional response, said second terminal being configured to examine said further transactional response and to accept said further transactional response as indicative of said first terminal having received said transactional response operative to act as a transactional message for said first terminal, if said further transactional response is in a correct form.

17. A second terminal, according to claim 15, for use where said first terminal is operative to determine that said transactional response is in a correct form if said transactional response conforms to any one out of a first plurality of possible correct forms.

18. A second terminal, according to claim 16, operative to determine that said further transactional response is in said correct form if said further transactional response conforms to any one out of a second plurality of possible correct forms.

19. A second terminal, according to claim 15, for use where said first terminal is a radio terminal, said second terminal also being a radio terminal.

20. A second terminal, according to claim 19, for use where said first terminal is a telephone handset, said second terminal being a radio telephone base station.

21. A second terminal, according to claim 20, wherein said base station is a satellite communications base station, operative to communicate with said telephone handset via a communications satellite.

22. A method for operating a communications system wherein a first terminal is operative to send a transactional message to a second terminal and wherein said second terminal is operative to send an acknowledgement of receipt of said transactional message to said first terminal and is thereafter operative to said a transactional response to said first terminal; said method comprising the steps of: causing said second terminal to skip sending said acknowledgement of said first terminal, causing said second terminal to send said transactional response in place of said acknowledgement, causing said first terminal to examine the form of said transactional response, and causing said first terminal to accept said transactional response as indicative of receipt of said transactional message by said second terminal if said transactional response is in a correct form.

23. A method, according to claim 22, including the steps of: employing said transactional response to act as a transactional message for said first terminal, causing said first terminal to skip sending an acknowledgement of receipt of said transactional response, causing said first terminal to send to said second terminal a further transactional response, causing said second terminal to examine said further transactional response and causing said second terminal to accept said further transactional response as indicative of said first terminal having received said transactional response operative to act as a transactional message for said first terminal, if said further transactional response is in a correct form.

24. A method, according to claim 22, including the step of causing said first terminal to determine that said transactional response is in a correct form if said transactional response conforms to any one out of a first plurality of possible correct forms.

25. A method, according to claim 22, including the step of causing said second terminal to determine that said further transactional response is in said correct form if said further transactional response conforms to any one out of a second plurality of possible correct forms.

26. A method, according to claim 22, wherein said first terminal is a radio terminal and said second terminal is a radio terminal.

27. A method, according to claim 26, wherein said first terminal is a telephone handset and said second terminal is a radio telephone base station.

28. A method, according to claim 27, wherein said base station is a satellite communications base station, operative to communicate with said telephone handset via a communications satellite.

* * * * *